(12) United States Patent
Pietraski et al.

(10) Patent No.: US 7,016,330 B2
(45) Date of Patent: Mar. 21, 2006

(54) COMPOSITE CHANNEL QUALITY ESTIMATION TECHNIQUES FOR WIRELESS RECEIVERS

(75) Inventors: Philip J. Pietraski, Huntington Station, NY (US); Robert A. DiFazio, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/703,265

(22) Filed: Nov. 7, 2003

(65) Prior Publication Data

US 2004/0146023 A1    Jul. 29, 2004

Related U.S. Application Data

(60) Provisional application No. 60/425,366, filed on Nov. 8, 2002.

(51) Int. Cl.
*H04Q 7/00* (2006.01)
*H04B 17/00* (2006.01)

(52) U.S. Cl. .................................. 370/333; 455/67.13

(58) Field of Classification Search ................ 370/328, 370/332, 333, 252, 479; 455/450, 452.1, 455/452.2, 517, 522, 67.11, 67.13, 226.1, 455/226.3
See application file for complete search history.

(56) References Cited

U.S. PATENT DOCUMENTS

| | | | |
|---|---|---|---|
| 6,724,719 B1 * | 4/2004 | Tong et al. ................. | 370/209 |
| 2002/0003785 A1 * | 1/2002 | Agin ......................... | 370/333 |
| 2002/0115443 A1 * | 8/2002 | Freiberg et al. ............. | 455/450 |
| 2003/0156554 A1 * | 8/2003 | Dillinger et al. ............ | 370/318 |
| 2004/0066754 A1 * | 4/2004 | Hottinen .................... | 370/252 |

* cited by examiner

*Primary Examiner*—Steven Nguyen
(74) *Attorney, Agent, or Firm*—Volpe and Koenig, P.C.

(57) ABSTRACT

Enhanced methods for channel quality estimation utilize soft symbol output data to generate a statistic or set of statistics that are representative of BER for each of a plurality of bursts corresponding to a composite channel. The statistics are mapped into a BER estimate to generate individual BER estimates for each of the plurality of bursts. The individual BER estimates are combined to obtain an estimate of the BER for the entire composite channel. Alternatively, the BER estimate for the composite channel may then be mapped into a quality estimate for the composite channel using a monotonic function.

25 Claims, 3 Drawing Sheets

COMPOSITE CHANNEL QUALITY ESTIMATION TECHNIQUES FOR WIRELESS RECEIVERS

CROSS REFERENCE TO RELATED APPLICATION

This application claims priority from U.S. Patent Application Ser. No. 60/425,366, filed Nov. 8, 2002, which is incorporated by reference as if fully set forth herein.

FIELD OF INVENTION

The present invention relates generally to wireless communications. In particular, the invention relates to channel quality estimation techniques for composite channels in wireless receivers.

BACKGROUND

Various algorithms have been developed for estimating channel quality at a wireless receiver. These algorithms are required, for example, in systems using the Third Generation Partnership Project (3GPP) High Chip Rate Time Division Duplex (TDD) mode, the 3GPP Low Chip Rate TDD mode, the 3GPP Frequency Division Duplex (FDD) mode, the time division—synchronous code division multiple access (TD-SCDMA) standard, and High Speed Downlink Packet Access (HSDPA) extensions of the aforementioned systems. The quality estimates may be used for transmit power control, in- and out-of-synchronization decisions, radio link failure decisions, and channel quality indicators (CQIs) to support adaptive modulation and coding (AMC) techniques.

In many wireless communication systems, transport channels are grouped, interleaved, coded and mapped onto groups of physical channels to form a composite channel. In the 3GPP standards, the composite channel is called a Coded Composite Transport Channel (CCTrCH).

A block of received data in a composite channel may be mapped onto a plurality of codes in a plurality of timeslots (also called slots) and/or a plurality of frames. A wireless receiver may use multi-user detection (MUD), a Rake receiver, or any type of demodulator to compute soft symbol values associated with the composite channel. Each partial data block, mapped onto one code, in one slot, in one frame, is referred to as a data burst. Multiple bursts can be transmitted and received simultaneously in code division multiple access (CDMA) systems. Symbols from each data burst are provided separately by the demodulator. Typically, a complete block of received data is spread over multiple bursts. Statistics are computed for each of these bursts, and then combined to provide a composite channel quality estimate. In cases where channel quality estimates are required and no data bursts are available or otherwise indicated, the same techniques can be applied to bursts carrying broadcast or pilot signals.

In order to implement power control in the 3GPP TDD standards, uplink (UL) and downlink (DL) CCTrCHs are paired. The quality of the DL CCTrCHs is monitored by the User Equipment (UE), whereas the Node B monitors the UL CCTrCHs. Various parameters, including the quality of the CCTrCHs, must be monitored to determine if an UL-DL group of CCTrCHs between a UE and Node B is of sufficiently high quality to remain in use. If the quality of the group of CCTrCHs is sufficiently high, the CCTrCHs are declared 'In-Sync'; whereas if the quality is insufficient, the CCTrCHs are declared 'Out-Of-Sync'. The 'Out-Of-Sync' condition eventually leads to a declaration of a radio link failure, whereby radio resources supporting the failed link are released.

A shortcoming of prior art channel estimation techniques is that they do not provide sufficiently accurate estimates of channel quality at the receiver. Inaccurate channel quality estimation can cause erroneous such as 'In-Sync' and 'Out-Of-Sync' declarations, reduce throughput, waste transmit power, and increase interference to other cells.

For 3GPP systems employing HSDPA, the high speed downlink shared channel (HS-DSCH) is a composite channel on which quality is computed to form a CQI as defined by 3GPP. The quality of the HS-DSCH channel is monitored at the UE, a CQI is computed, then it is reported back to the Node B. The CQI effectively provides a recommended coding and modulation scheme for the AMC function. If the CQI is not accurate, the recommended coding and modulation scheme will be suboptimal. Overestimating channel quality can cause the UE and Node B to continue attempting to use a modulation and coding scheme when reception quality is too poor to justify their continued use. Underestimation of channel quality may lead to excessive transmit power or ultimately a premature declaration of radio link failure and release of radio resources. Thus, a call may be dropped without cause. Excessive transmit power will, in turn, lead to a system-level throughput loss, due to the fact that interference in other cells may increase needlessly.

Accordingly, what is needed is an improved method for estimating channel quality which is devoid of the disadvantages of prior art techniques.

SUMMARY

Enhanced estimation of channel quality is achieved by using soft symbol values to generate a statistic, or set of statistics, that are representative of the bit error rate (BER) for each of a plurality of bursts corresponding to a composite channel. The statistics are mapped into a BER estimate to generate individual BER estimates for each of the plurality of bursts. The individual BER estimates are combined to obtain an estimate of the BER for the entire composite channel. The BER estimate for the composite channel may then mapped into a quality estimate for the composite channel.

Pursuant to an alternative embodiment of the invention, the BER estimate for the composite channel is used to compute a CQI for HSDPA applications. The CQI is a specific measure of channel quality.

The enhanced quality estimation procedures of the present invention are equipped to estimate the quality of a received block of data that spans periods of differing interference levels and differing numbers of included codes. In this manner, information throughput may be increased, system capacity increased, transmitted power may be conserved, and interference to other cells may be reduced.

BRIEF DESCRIPTION OF THE DRAWINGS

A more detailed understanding of the invention may be acquired from the following description of various preferred embodiments, given by way of example and to be understood in conjunction with the accompanying drawings where.

The following abbreviations are used in the present application:
3GPP third generation partnership project
AMC adaptive modulation and coding
AWGN additive white Gaussian noise
ASIC application specific integrated circuit
BER bit error rate
BQE burst quality estimation
CCQE composite channel quality estimate
CCTrCH coded composite transport channel
CDMA code division multiple access
CQI channel quality indicator
DL downlink
FDD frequency division duplex
HSPDA high speed downlink packet access
HS DSCH high-speed downlink shared channel
LUT look up table
ML maximum likelihood
MUD multi-user detection
QAM quadrature amplitude modulation
SER symbol error rate
SIR signal to interference ratio
TD-SCDMA time division—synchronous code division multiple access
TDD time-division duplex
UE user equipment
UL uplink
WTRU wireless transmit/receive unit

DETAILED DESCRIPTION OF THE PREFERRED EMBODIMENT(S)

In wireless communication systems, estimating the quality of a composite channel involves various complexities. Composite channels, (including, for example, CCTrCHs and HS-DSCHs), may occupy multiple bursts in multiple slots within a frame. Since bursts may be distributed over multiple slots, the signal-to-interference ratio (SIR) of individual bursts comprising a composite channel will vary. Although one could simply average all SIR estimates obtained from different slots, this approach tends to overestimate the quality of the composite channel. On the other hand, if the lowest SIR is selected, this approach exhibits a tendency to underestimate the quality of the composite channel.

The present invention is motivated by the view that a useful quality estimate is representative of the BER of the composite channel, similar to the way the SIR of one burst can be mapped to the BER of that burst if the channel is constant and the interference is adequately modeled as additive white Gaussian noise (AWGN). The complexity of providing such a composite channel quality value derives from the different SIRs, and possibly low SIRs, associated with each burst comprising the composite channel.

To overcome the drawbacks of simple averaging of SIRs, the present invention generates a plurality of individual BER estimates, where each individual estimate corresponds to a portion of the composite channel. These individual BER estimates are then combined to obtain an estimate of the BER for the entire composite channel. The BER estimate for the composite channel may be regarded as the quality estimate for the composite channel; or composite channel quality estimate (CCQE). The present invention sets forth novel methods to form the composite quality estimate given soft symbols associated with each burst of the data block.

Alternatively (or additionally), the BER estimate for the composite channel may then be used in a mapping procedure to provide a quality estimate for the composite channel. This mapping procedure preferably employs a monotonic function of the BER estimate, such as effective SIR, to generate a quality estimate for the composite channel. Pursuant to a further embodiment of the invention, the composite channel is a HS-DSCH channel and the quality estimate is the CQI.

The present invention may be utilized at a wireless transmit/receive unit (WTRU), a UE, a Node B, and/or a base station. Hereafter, a WTRU includes but is not limited to a user equipment, mobile station, fixed or mobile subscriber unit, pager, or any other type of device capable of operating in a wireless environment. When referred to hereafter, a base station includes but is not limited to a Node-B, site controller, access point or other interfacing device in a wireless environment.

The description of the present invention that follows uses BER as the quality estimate or as an interim step to a quality estimate. Those skilled in the art will know that an alternate quantity, such as mean squared error, may be computed that can be mapped to a BER estimate, or an alternate measure or approximation of BER can be substituted without changing the concepts presented. Further, rather than BER, symbol error rate (SER) may be used, particularly with high order modulations such as quadrature amplitude modulation (QAM).

Figure 1:
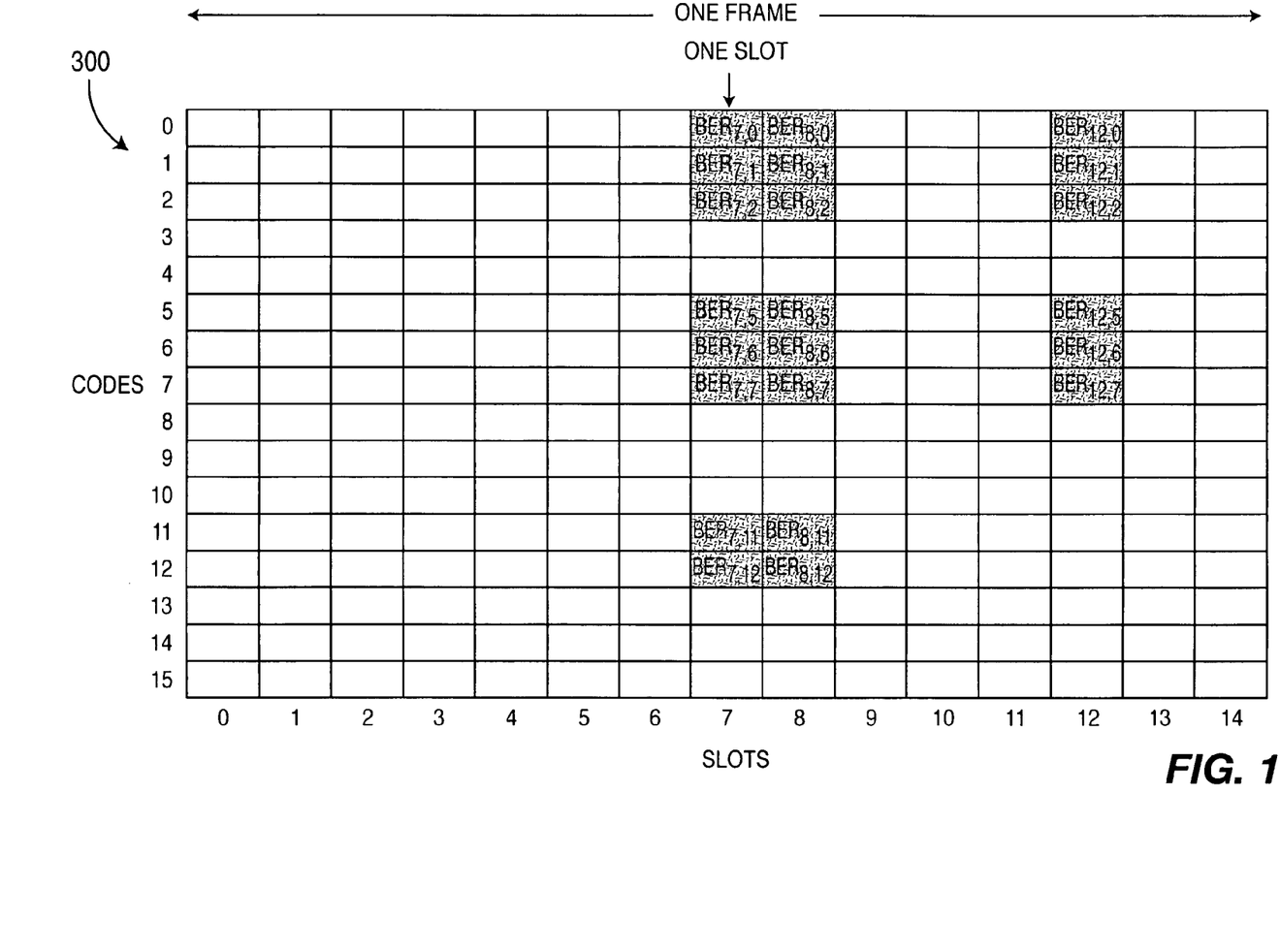
FIG. 1 is an example of a mapping of a composite channel onto codes and slots in a frame, showing BER estimates associated with each burst.

Referring to FIG. 1, an example of a signal map 300 illustrating mapping of a composite channel into codes and slots is shown. The foregoing description assumes that the composite channel is fully contained in one frame. However, the bursts can be distributed over multiple frames. Additionally, the signal map 300 shows a frame comprising fifteen timeslots and up to sixteen codes. However, the description can apply to any number of each. In general, a composite channel is mapped into a group of M bursts contained within N timeslots; where $N \leq M$. In FIG. 1, M=22 and N=3.

A demodulator, which may be a MUD, Rake receiver, or any applicable processor, provides a sequence of soft symbols $d_{s,c}(n)$ for each burst, where s denotes the slot number and c denotes the code number. A bit error rate $BER_{s,c}$ is estimated for each of the bursts as shown in FIG. 1 and combined to form the quality estimate, (or as a step in forming the final quality estimate).

Each BER estimate is derived from statistics computed from the sequence $d_{s,c}(n)$. It is assumed that, within each slot, the signal power for each code is constant, the interference power level is constant, and the interference is adequately modeled as AWGN. The effective SIR of each burst can then be mapped to a BER estimate in preparation for further combining.

Figure 2:
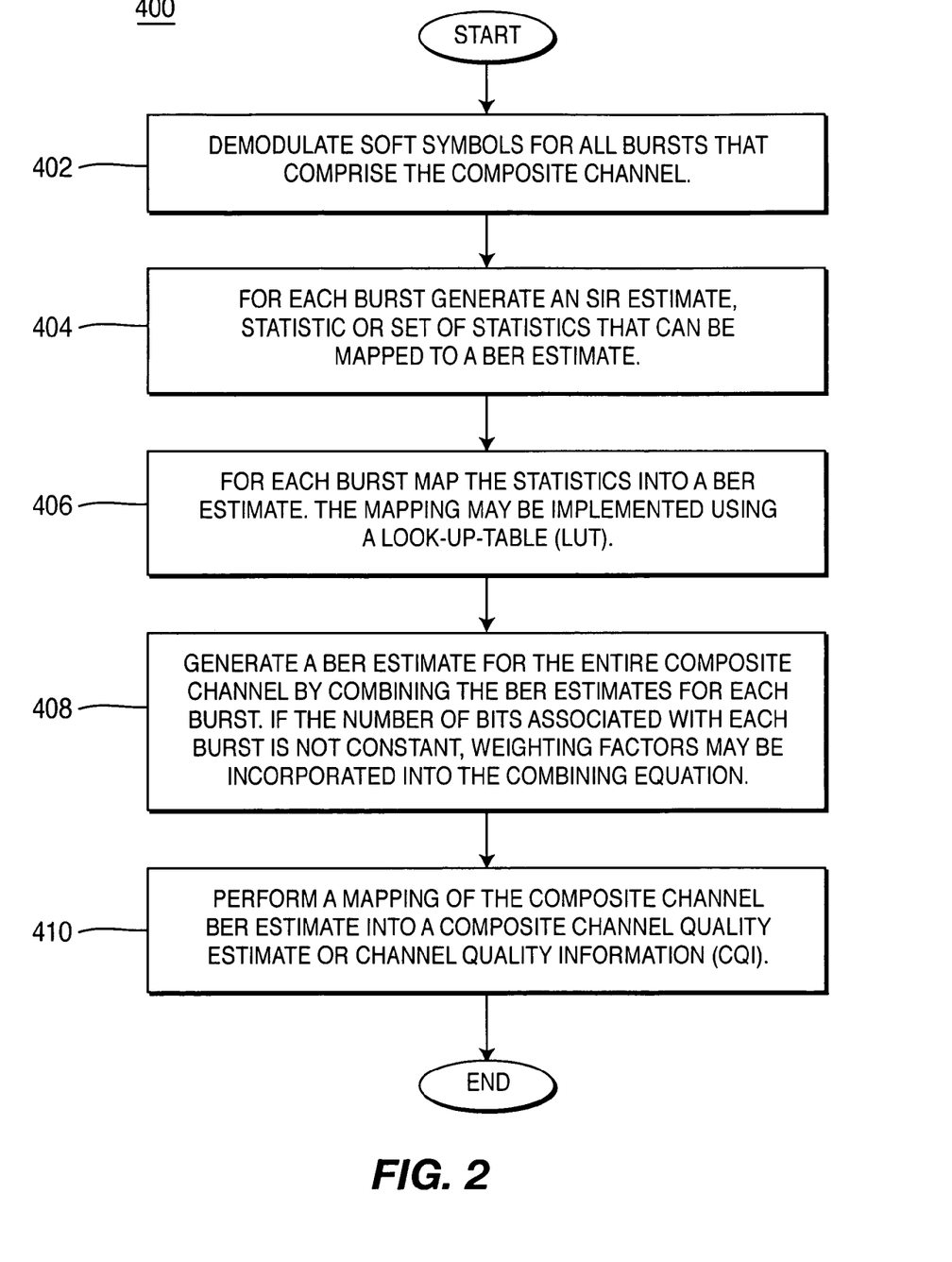
FIG. 2 is a flowchart setting forth an operational sequence for generating a composite channel quality estimate according to a preferred embodiment of the invention.

Referring to FIG. 2, a flow diagram setting forth a method 400 for generating a composite channel quality estimate according to a preferred embodiment of the present invention is shown. Although the composite channel may be described hereinafter for convenience as a CCTrCH or HS-DSCH channel, it should be noted that the composite channel quality estimation techniques of the invention are applicable to virtually any type of composite channel which includes a plurality of codes, time slots, frequencies, or frequency slots, such as a pilot signal transmitted on a single code.

The method of FIG. 2 commences at step 402, where a demodulator provides a sequence of soft symbols $d_{s,c}(n)$ for each burst comprising the composite channel. In step 404, an SIR estimate (or other statistic or set of statistics that are not SIR that can be mapped to a BER) is computed for each individual $d_{s,c}(n)$ sequence. Other statistics may include both SIR-type statistics and non-SIR type statistics such as the Maximum Likelihood (ML) estimate of the SIR, the Kurtosis estimate, or Skewness estimate, Mean Ratio, or Delay Difference to name just a few. Those of skill in the art would realize that there are many other types of statistics that could be used, and that multiple statistics could be used together, without departing from the scope of the present invention.

One embodiment of the SIR estimate (step 404) is to use a maximum likelihood (ML) estimate of the SIR of the post-detected data given by:

$$\hat{SIR}_{ML} = \left(\frac{\hat{m}^2}{\hat{\sigma}^2}\right)_{ML},\quad \text{Equation (1)}$$

where m is the mean and $\sigma^2$ is the variance of the data sequence, $d_{s,c}(n)$; $\hat{\ }$ indicates an estimate; and the ML subscript indicates the maximum likelihood estimate. It is a property of ML estimates that:

$$\hat{SIR}_{ML} = \frac{\hat{m}^2_{ML}}{\hat{\sigma}^2_{ML}}.\quad \text{Equation (2)}$$

This permits computing the ML estimates of the numerator and denominator separately. The resulting estimate is then $$\hat{SIR}_{ML} = \frac{\left(\frac{1}{N_s}\sum \text{Re}\{d(n)\hat{d}^*(n)\}\right)^2}{\frac{1}{N_s}\sum |d(n)|^2 - \left(\frac{1}{N_s}\sum \text{Re}\{d(n)\hat{d}^*(n)\}\right)^2}\quad \text{Equation (3)}$$

where $\hat{d}(n)$ is the hard decision of d(n)

$$\left(\text{i.e., } \hat{d}(n) = \arg\left\{\min_{a\in\{\pm 1,\pm j\}} |a - d(n)|\right\}\right);$$

$(\bullet)^*$ is the complex conjugate of $(\bullet)$; and $N_s$ is the number of soft symbols in the sum.

As set forth hereinbefore, any of several other approaches may be adopted to estimate SIR at step 404 of FIG. 2. Whether the statistics are SIR-based or another type of non-SIR-based statistic that can eventually be mapped onto a BER, these approaches all share a common characteristic in that data from the demodulator is collected and used to generate a statistic and that statistic is then mapped onto a BER estimate.

Next, a BER estimate is generated for each burst belonging to the composite channel by mapping the SIR estimate (or other statistic) into a BER estimate (step 406). The mapping from SIR to BER may be implemented using a look-up table (LUT), although this is not required. The LUT that maps the SIR (or other statistic) to a BER at step 406 may be determined empirically by a computer simulation of the demodulator, where the corresponding statistic is computed for each burst and the BER is measured via Monte Carlo simulations. By repeating the simulation a large number of times over a range of values, a table relating the SIR (or other statistic) to BER can be developed. Alternatively, an analytical expression can be developed, assuming an AWGN channel or other applicable approximation.

Table 1 is an example of an SIR to BER LUT. The first column is the SIR estimate. The second column is the associated BER scaled by a factor of $2^9$.

TABLE 1

Example of a table that maps SIR to BER.

| SIR(dB) | $2^9$ * BER | SIR(dB) | $2^9$ * BER |
|---|---|---|---|
| 0 | 256 | 4.8 | 28 |
| 0.15 | 256 | 4.95 | 25 |
| 0.3 | 246 | 5.1 | 23 |
| 0.45 | 223 | 5.25 | 21 |
| 0.6 | 200 | 5.4 | 19 |
| 0.75 | 180 | 5.55 | 17 |
| 0.9 | 161 | 5.7 | 16 |
| 1.05 | 143 | 5.85 | 14 |
| 1.2 | 127 | 6 | 13 |
| 1.35 | 112 | 6.15 | 11 |
| 1.5 | 101 | 6.3 | 11 |
| 1.65 | 97 | 6.45 | 10 |
| 1.8 | 93 | 6.6 | 9 |
| 1.95 | 89 | 6.75 | 8 |
| 2.1 | 85 | 6.9 | 7 |
| 2.25 | 81 | 7.05 | 6 |
| 2.4 | 78 | 7.2 | 6 |
| 2.55 | 74 | 7.35 | 5 |
| 2.7 | 70 | 7.5 | 5 |
| 2.85 | 67 | 7.65 | 4 |
| 3 | 63 | 7.8 | 4 |
| 3.15 | 60 | 7.95 | 3 |
| 3.3 | 56 | 8.1 | 3 |
| 3.45 | 53 | 8.25 | 2 |
| 3.6 | 50 | 8.4 | 2 |
| 3.75 | 47 | 8.55 | 2 |
| 3.9 | 44 | 8.7 | 1 |
| 4.05 | 41 | 8.85 | 1 |
| 4.2 | 38 | 9 | 1 |
| 4.35 | 35 | 9.15 | 1 |
| 4.5 | 32 | 9.3 | 0 |
| 4.65 | 30 | 9.45 | 0 |

A BER estimate for the entire composite channel is then generated (step 408) by combining all BER estimates corresponding to bursts that comprise the composite channel. Optionally, weighting factors may be applied to this averaging process if appropriate or desired.

One embodiment of step 408 is to compute the composite channel BER as an average of the individual burst BER estimates. Specifically, $$BER_{Composite\ channel} = (\Sigma BER_{s,c})/M, \quad \text{Equation (4)}$$

where the sum is taken over all codes and slots and M is the total number of bursts.

An alternative embodiment of step 408 is to compute a weighted average given by $$BER_{Composite\ channel} = (\Sigma w(s,c)BER_{s,c}), \quad \text{Equation (5)}$$

where w(s,c) may apply greater weight to bursts that contain more bits. Typically, w(s,c) has the property, $\Sigma$ w(s,c)=1.

Other BER combining functions may also be used.

Mapping of the BER estimate for the composite channel is then performed (step 410). The mapped BER estimate is taken as the quality estimate for the composite channel, such as CQI for HSPDA.

The mapping from $BER_{Composite\ channel}$ to the composite channel quality estimate or CQI (step 410) may also be implemented using an analytical expression or a LUT. It is often desirable (though not necessary) to define a quality parameter such that higher numbers correspond to high quality, (i.e., a lower BER). One example of an analytical expression for the composite channel quality is:

$$Q = 63 - \max\{\lfloor 64(\log |BER| + 4.155)/4.155 \rfloor, 0\}, \quad \text{Equation (6)}$$

where Q is the composite channel quality value and $\lfloor \cdot \rfloor$ denotes the floor function (round towards minus infinity). This provides a logarithmic mapping of BER onto integers from 0–63. Table 2 is an example of a LUT where the first column is BER scaled by a factor of $2^9$ and the second column is the corresponding quality value. Numerous other mappings can be developed as required.

TABLE 2

Example of a table that maps BER to Quality.

| $2^9$ * BER | Quality |
|---|---|
| 256–224 | 4 |
| 223–191 | 5 |
| 190–162 | 6 |
| 161–144 | 7 |
| 143–128 | 8 |
| 127–113 | 9 |
| 112–98 | 10 |
| 97–86 | 11 |
| 85–71 | 12 |
| 70–64 | 13 |
| 63–54 | 14 |
| 53–45 | 15 |
| 44–39 | 16 |
| 38–33 | 17 |
| 32–29 | 18 |
| 28–26 | 19 |
| 25–22 | 20 |
| 21–19 | 21 |
| 18–17 | 22 |
| 16–15 | 23 |
| 14–13 | 24 |
| 12–11 | 25 |
| 10–9 | 26 |
| 8 | 27 |
| 7 | 28 |
| 6 | 29 |
| 5 | 30 |
| 4 | 32 |
| 3 | 34 |
| 2 | 37 |
| 1 | 41 |
| 0 | 63 |

Figure 3:
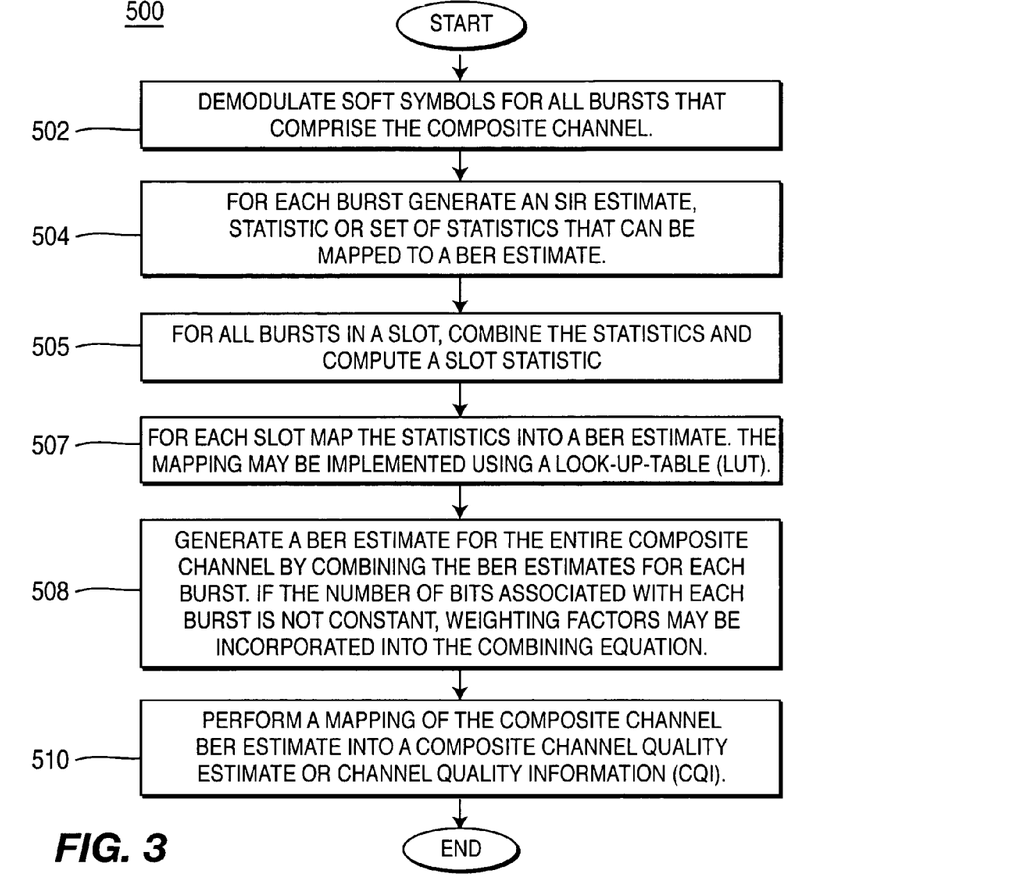
FIG. 3 is a flowchart setting forth an operational sequence for generating a composite channel quality estimate according to an alternate embodiment of the invention.

FIG. 3 is an alternate embodiment of the invention that shows a method 500 for generating a composite channel quality estimate. The method 500 of FIG. 3 commences with the same two steps as the method 400 of FIG. 2, that is, steps 502 and 504 are the same as steps 402 and 404. However, in the method 500 of FIG. 3 the statistics for all bursts that share the same slot are combined to form a slot statistic (step 505), such as a slot SIR or an equivalent statistic that can be mapped to BER. The slot statistic is mapped into a BER estimate in step 507. Steps 508 and 510 are the same as steps 408 and 410, respectively of FIG. 2.

The alternate embodiment of FIG. 3 takes advantage of the fact that bursts occupying the same slot may be subject to the same (or nearly the same) type and quantity of interference. This depends on the type of demodulator, the communication channel/multipath characteristics, the properties of the codes used to separate the bursts, and the relative code power. Accordingly, the principles of this embodiment may not apply in general, but may be an acceptable approximation in some circumstances. An improved estimate of the SIR, and ultimately the BER, is achieved by combining statistics over the slot before mapping to a BER.

One example of computing the slot statistics (step 505), such as SIR, is simply averaging the individual burst SIRs:

$$SlotSIR_s = \frac{1}{N_c} \sum_{c \in slot} SlotSIR_{s,c}, \quad \text{Equation (7)}$$

$SlotSIR_{s,c}$ are the individual slot SIRs in slot s using code c; the sum is taken over all codes mapped to the composite channel in slot s; $N_c$ is the number of codes mapped to the composite channel in slot s; and $SlotSIR_s$ is the resulting SIR estimate for the slot. This approach is convenient when, for example, other processes in a receiver provide individual burst SIRs so they are available to the burst quality estimation algorithm without further computation.

An alternative for computing the slot SIR (step 505) is to combine individual signal and interference power estimates first, and then compute the slot SIR:

$$SlotSIR_s = \frac{\sum_{c \in slot} Sig\hat{P}wr_{s,c}}{\sum_{c \in slot} Noise\hat{P}wr_{s,c}}. \quad \text{Equation (8)}$$

$SigPwr_{s,c}$ and $NoisePwr_{s,c}$ are the individual signal and noise (or interference) power estimates, respectively, for composite channel bursts in slot s using code c.

Combining signal power and interference power for multiple bursts before computing the statistic, such as SIR, provides enhanced mitigation of biases in the estimation error that may occur due to a relatively small amount of data used in a burst quality estimation (BQE) algorithm. For example, consider the expected value of the slot SIR estimates versus the burst SIR estimates. The bias in SIR estimation due to small data sets is reduced by first averaging signal and noise power estimates over several codes, $N_c$, as shown in Equation (9):

$$E\left\{\frac{\sum Sig\hat{P}wr}{\sum Noise\hat{P}wr}\right\} =$$

$$E\left\{\frac{E\{Sig\hat{P}wr\} + \frac{1}{N_c}\sum e_S}{E\{Noise\hat{P}wr\} + \frac{1}{N_c}\sum e_N}\right\} \xrightarrow{N_c \to \infty} \frac{E\{Sig\hat{P}wr\}}{E\{Noise\hat{P}wr\}}$$

The terms $e_S$ and $e_N$ are error terms that result from using a finite set of data to make signal and noise power estimates and are necessarily zero mean by construction. The second terms in the numerator and denominator tend to zero for an increasing number of codes used, $N_c$. For burst SIRs and averaged burst SIRs, the bias does not tend to zero for large $N_c$ since the averaging does not reduce the error terms. That is, if the zero mean error terms $e_S$ and $e_N$ cause a bias in the SIR estimate for a burst, the bias will not be reduced by averaging SIR estimates. This is shown in the following equation:

$$E\left\{\frac{1}{N_c}\sum \frac{Sig\hat{P}wr}{Nois\hat{e}Pwr}\right\} = E\left\{\frac{Sig\hat{P}wr}{Nois\hat{e}Pwr}\right\} = E\left\{\frac{E\{Sig\hat{P}wr\} + e_S}{E\{Nois\hat{e}Pwr\} + e_N}\right\} \not\rightarrow \frac{E\{Sig\hat{P}wr\}}{E\{Nois\hat{e}Pwr\}} \quad \text{Equation (10)}$$

Though two examples of computing the slot SIR have been presented, other algorithms can be substituted.

Figure 4:
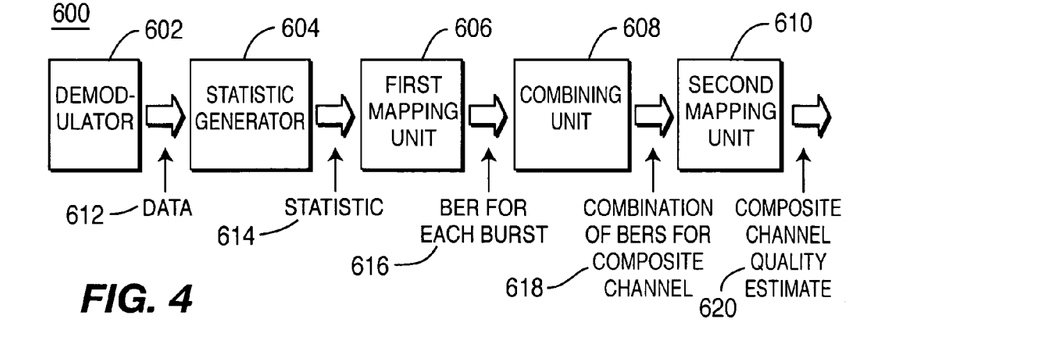
FIG. 4 is a system made in accordance with the teachings of the present invention.

Referring to FIG. 4, a system 600 made in accordance with the present invention is shown. The system includes a demodulator 602, a statistic generator 604, a first mapping unit 606, a combining unit 608 and a second mapping unit 610. It should be noted that the first and second mapping units 606, 610 may be combined into a dual-use mapping unit. Additionally, all of the components 602–610 may be implemented in a single processing unit and/or on a single application specific integrated circuit (ASIC).

The demodulator 602, which may be a MUD, a Rake receiver or any applicable processor, provides output data 612. The data is input to the statistic generator which generate a statistic 614. The statistic may be any, or a combination, one of the of aforementioned types of SIR or non-SIR types of estimates or statistics.

The first mapping unit 606 provides a bit error rate estimate 616 for each input statistic. This may be implemented as an LUT, or may be determined in real time by an analytical expression. The BER of each burst 616 is input into the combining unit 608 which provides a BER estimate for the entire composite channel by combining all individual BER estimates, whether they are for individual bursts or are performed on a per-slot basis. The combination of BERs for the composite channel 618 is output from the combining unit to the second mapping unit 610 which provides a mapping a the combination of BERs for the composite channel to a composite channel quality estimate 620. The second mapping unit 610 may also be implemented using an analytical expression or an LUT.

The foregoing description of the preferred embodiments are to be understood as an example only and not by way of a limitation. Accordingly, modifications which can be incorporated into, and/or used in conjunction with, the inventive method to obtain an improved channel quality estimate are considered to be included within the scope of the invention. The inventive method is equally applicable to 3GPP TDD, FDD, HSDPA, TD-SCDMA, CDMA and other receivers, which may be based on demodulator outputs comprising a set of partial data blocks that comprise a composite channel.

What is claimed is:

1. A method of estimating a quality of a composite channel associated with a plurality of data bursts, the method comprising:
   (a) generating a sequence of symbols for each data burst;
   (b) estimating a signal-to-interference ratio (SIR) of each sequence of symbols;
   (c) mapping each SIR estimate into a bit error rate (BER) estimate; and
   (d) determining a composite BER estimate based on the BER estimates, wherein the composite BER estimate is used to estimate the quality of the composite channel.

2. The method of claim 1 wherein step (d) further comprises combining the BER estimates.

3. The method of claim 1 wherein step (d) further comprises averaging the BER estimates.

4. The method of claim 3 wherein at least one of the averaged BER estimates is weighted.

5. The method of claim 1 further comprising:
   (e) mapping the composite BER estimate to a quality estimate of the composite channel.

6. The method of claim 5 wherein the quality estimate is a channel quality indicator (CQI).

7. The method of claim 1 wherein each sequence of symbols is associated with a particular time slot and code.

8. The method of claim 1 wherein each BER estimate is derived from statistics associated with the sequence of symbols.

9. The method of claim 1 wherein the composite channel is a high-speed downlink shared channel (HS-DSCH).

10. The method of claim 1 wherein the composite channel is a coded composite transport channel (CCTrCH).

11. The method of claim 1 wherein the SIR of each sequence of symbols is performed using a maximum likelihood (ML) SIR estimate.

12. A system for estimating a quality of a composite channel associated with a plurality of data bursts, the system comprising:
   (a) means for generating a sequence of symbols for each data burst;
   (b) means for estimating a signal-to-interference ratio (SIR) of each sequence of symbols;
   (c) means for mapping each SIR estimate into a bit error rate (BER) estimate; and
   (d) means for determining a composite BER estimate based on the BER estimates, wherein the composite BER estimate is used to estimate the quality of the composite channel.

13. The system of claim 12 wherein the composite BER estimate determining means combines the BER estimates.

14. The system of claim 12 wherein the composite BER estimate determining means averages the BER estimates.

15. The system of claim 14 wherein at least one of the averaged BER estimates is weighted.

16. The system of claim 12 further comprising:
   (e) means for mapping the composite BER estimate to a quality estimate of the composite channel.

17. The system of claim 16 wherein the quality estimate is a channel quality indicator (CQI).

18. The system of claim 12 wherein the means for generating the sequence of symbols is a demodulator.

19. The system of claim 18 wherein the demodulator is a Rake receiver.

20. The system of claim 18 wherein the demodulator performs multi-user detection (MUD).

21. The system of claim 12 wherein each sequence of symbols is associated with a particular time slot and code.

22. The system of claim 12 wherein each BER estimate is derived from statistics associated with the sequence of symbols.

23. The system of claim 12 wherein the composite channel is a high-speed downlink shared channel (HS-DSCH).

24. The system of claim 12 wherein the composite channel is a coded composite transport channel (CCTrCH).

25. The system of claim 12 wherein the SIR of each sequence of symbols is performed using a maximum likelihood (ML) SIR estimate.

* * * * *

UNITED STATES PATENT AND TRADEMARK OFFICE
CERTIFICATE OF CORRECTION

PATENT NO. : 7,016,330 B2
APPLICATION NO. : 10/703265
DATED : March 21, 2006
INVENTOR(S) : Piestraski et al.

It is certified that error appears in the above-identified patent and that said Letters Patent is hereby corrected as shown below:

Column 2, line 44, after the word "then", insert --be--.

Column 5, line 55, after the words "conjugate of", delete "$^{(\cdot)}$" and insert therefor --($\cdot$)--.

Column 7, line 20, after the words "example of", delete "a" and insert therefor --an--.

Column 9, line 32, before the words "a statistic", delete "generate" and insert therefor --generates--.

Signed and Sealed this

Twelfth Day of December, 2006

JON W. DUDAS
*Director of the United States Patent and Trademark Office*